United States Patent [19]
Kishishita et al.

[11] Patent Number: 5,867,360
[45] Date of Patent: Feb. 2, 1999

[54] VARIABLE CAPACITOR

[75] Inventors: Hiroyuki Kishishita; Yukinori Ueda, both of Fukui-ken, Japan

[73] Assignee: Murata Manufacturing Co., Ltd., Nagaokakyo, Japan

[21] Appl. No.: 994,443

[22] Filed: Dec. 19, 1997

[30] Foreign Application Priority Data

Dec. 20, 1996 [JP] Japan ..................................... 8-341173

[51] Int. Cl.⁶ .............................. H01G 5/04; H01G 5/06; H01G 7/00
[52] U.S. Cl. ....................... 361/292; 361/293; 361/298.1; 361/298.4; 29/25.42
[58] Field of Search ..................................... 361/292–297, 361/298.1–298.5, 299.1–299.5; 29/25.42

[56] References Cited

U.S. PATENT DOCUMENTS

| | | | |
|---|---|---|---|
| 4,292,660 | 9/1981 | Tatsumi | 361/293 |
| 4,389,696 | 6/1983 | Azuchi | 361/293 |
| 4,649,459 | 3/1987 | Azuchi | 361/293 |
| 5,461,535 | 10/1995 | Kishishita et al. | 361/298.1 |

*Primary Examiner*—Bot Ledynh
*Attorney, Agent, or Firm*—Burns, Doane, Swecker & Mathis, LLP

[57] ABSTRACT

In a variable capacitor having a stator with a stator electrode and a rotor with a rotor electrode both of which are housed in a recess section of a casing while allowing the recess section to be closed by a cover, enabling the rotor to be brought into stable close contact with the stator. To this end, a cover (46) made of a chosen metal includes a cover main body (55) which covers the upper opening of a recess section (45) except for an adjustment hole (54) that exposes a driver groove (30) of the rotor (43), leg sections (56, 57) which engage a casing (44) letting the cover main body (55) be secured to the casing (44), and a rotor terminal. The cover main body (55) has a size corresponding to the outer diameter of the variable capacitor (41). This cover main body (55) may have a vent shape so as to create intended elastic force which may act to compress the rotor (43) against the stator (42). More preferably, a spring washer (60) is provided which integrally extends from the cover main body (55) and is folded so that it is placed between the cover main body (55) and the rotor (43).

19 Claims, 7 Drawing Sheets

VARIABLE CAPACITOR

BACKGROUND OF THE INVENTION

1. Field of the Invention

This invention relates to variable capacitors and, more particularly, to variable capacitors with electrostatic capacitances made variable by changing the effective opposing or overlapping area of a stator electrode and a rotor electrode due to rotation of the rotor electrode relative to the stator electrode.

2. Description of the Related Art

A prior known variable capacitor 1 is shown in FIGS. 17 and 18. FIG. 17 shows a plan view whereas FIG. 18 is a cross-sectional view along line XVIII—XVIII of FIG. 17.

The variable capacitor 1 includes a stator 3 made of resin with a stator terminal 2 being insert-molded therein. The stator terminal 2 is integrally formed with a stator electrode 4 which is exposed to the upper surface of the stator 3. A rotor 5 made of a dielectric material is disposed on the upper surface of the stator 3 while a rotor electrode 6 is formed on the upper surface of rotor 5 in a way such that it opposes stator electrode 4 with rotor 5 being positioned therebetween.

A shaft 7 made of metal is rotatably mounted by penetrating the stator 3, with the above-mentioned rotor 5 being coupled to the shaft 7 in such a way that the rotor 5 is integrally rotatable with this shaft 7. The shaft 7 forms a head 8 on its upper end section. The head 8 includes a driver groove 9 formed in the upper surface of this head 8. In addition, the shaft 7 is electrically connected to the rotor electrode 6 via a projection 10.

A disk-like spring 11 is engaged with the shaft 7 on the lower surface side of the stator 3. The lower end section of the shaft 7 is locked or caulked whereby disk spring 11 is in the state that it creates an elastic force which acts to compress rotor 5 toward stator 3 through shaft 7. The disk spring 11 also permits integral formation of a rotor terminal 12.

In the variable capacitor 1 thus arranged, the electrostatic capacitance as formed vis-a-vis the facing arrangement of the stator electrode 4 and rotor electrode 6, the leads to which are taken out between the stator terminal 22 and rotor terminal 12. Also, the electrostatic capacitance is variable by rotating the rotor 5 via the shaft 7 so as to change the effective opposing or overlapping area of the stator electrode 4 and the rotor electrode 6.

On the other hand, FIGS. 19 and 20 show another variable capacitor 21 in accordance with the second prior art. FIG. 19 depicts a plan view whereas FIG. 20 is a cross-sectional view along line XX—XX of FIG. 19.

The variable capacitor 21 includes a casing 23 made of resin with a stator terminal 22 being insertion-molded therein. The casing 23 is provided with a recess section 24 in which a stator 25 made of a dielectric material is statically disposed with a rotor 26 made of metal being rotatably housed thereon.

A stator electrode 27 is formed on the lower surface of the stator 25. The aforesaid stator terminal 22 causes a contact section 28 to be integrally formed for being elastically contacted with the stator electrode 27. On the other hand, a rotor electrode 29 is formed on the lower surface of the rotor 26 such that it opposes the stator electrode 27 with the stator 25 therebetween. A driver groove 30 is formed in the upper surface of the rotor 26.

The upper opening of the recess section 24 is covered by a cover 32 made of metal, except for an adjustment hole 31 which exposes the driver groove 30 to the outside. The cover 32 integrally forms a spring contact piece 33 which elastically biases the upper surface of the rotor 26 away from a rotor terminal 34. After inserting the stator 25, the rotor 26 and the cover 32 into the recess section 24, the upper end edge 35 of the casing 23 is heated and deformed to change from the state designated by imaginary or phantom line to the state as indicated by the solid line in FIG. 20, whereby the cover 32 is secured to the casing 23 while at the same time allowing the spring contact piece 33 to produce elastic force which acts to compress the rotor 26 against the stator 25.

In the variable capacitor 21 structured as described above, the electrostatic capacitance as formed vis-a-vis the facing arrangement of the stator electrode 27 and the rotor electrode 29, and is measurable between the stator terminal 22 and the rotor terminal 34. The electrostatic capacitance is variable by changing the effective opposing areas of the stator electrode 27 and the rotor electrode 29 due to rotation of the rotor 26.

However, the first and second prior art devices stated above encounter problems, such as follow.

First, in the variable capacitor 1 in accordance with the first prior art embodiment shown in FIGS. 17 and 18, the disk spring 11 is used to cause the stator 3 and the rotor 5 to be in close contact with each other. However, minute size variations can occur at respective portions due to heating during a solder reflow process, which is applied when this variable capacitor 1 is assembled on a printed circuit board. These size variations might lead to a decrease in spring pressure as applied by the disk spring 11, which would result in the risk of loosening the aforesaid close contact state, which in turn serves to decrease the torque for use in rotating the shaft 7 and/or let the electrostatic capacitance be rendered unstable due to drift in the setting.

In addition, while a hand tool such as a screwdriver is inserted into the driver groove 9 when an attempt is made to adjust the electrostatic capacitance, since the head 8 of shaft 7 in which such driver groove 9 is formed is placed so as to project from the remaining portion of this variable capacitor 1, it is rather difficult to reliably insert the screwdriver or the like into driver groove 9. It also remains difficult to eliminate the risk that the screwdriver or the like from spinning off from driver groove 9 after insertion thereof. For these reasons the workability of capacitance adjustment remains relatively low.

Further, during soldering using reflow techniques or soldering irons, flux can move or drift along the shaft 7 or splash and scatter therearound, thereby invading the sliding faces of the stator 3 and the rotor 5. As a result, the electrostatic capacitance stability and Q characteristics can decrease.

Furthermore, since the stator electrode 4 is embedded in the stator 3 made of a resin material that is easily deformable, both thermally and mechanically, a contact with the rotor 5 can become unstable, resulting in the electrostatic capacitance being unstable accordingly.

Next, in the variable capacitor 21 in accordance with the second prior art device shown in FIGS. 19 and 20, after the stator 25, the rotor 26 and the cover 32 are inserted into the recess section 24, the cover 32 is then secured to the casing 23 by causing the upper end edge 35 of the casing 23 to deform while heat is applied thereto.

However, apparatus for heating the casing 23 for such deformation is generally large-scaled in structure resulting in an increase in cost of the variable capacitor 21. In addition, while cooling must be carried out while retaining deformation of the upper end edge 35 of the casing 23, a relatively long time duration might be required for accomplishment of this cooling process.

SUMMARY OF THE INVENTION

It is therefore an object of this invention to provide a variable capacitor capable while avoiding the various kinds of problems mentioned above.

A variable capacitor in accordance with this invention comprises a stator made of a chosen dielectric material with a stator electrode formed thereon, a rotor having conductivity and being disposed above this stator with a rotor electrode being formed on its lower surface to oppose the stator electrode through the stator and with a driver groove formed on the upper surface thereof, a casing made of resin and having a recess section for statically housing the stator and rotatably housing the rotor therein respectively, the casing having a stator terminal being insert-molded therein to be electrically connected to the stator electrode, and a cover made of metal.

The aforesaid cover forms a cover main body as formed to cover the upper opening of the recess section except for an adjustment hole which is for exposing the driver groove, leg sections extending from both side sections of the cover main body for securing this cover main body to the casing by engagement with the casing, respectively, and a rotor terminal extending from the cover main body.

In this invention, the cover main body is preferably arranged so that it has a bent shape to provide elastic force pressing the rotor to the stator.

Also preferably, the cover main body is selected to have a shape as bent to substantially define a partially cylinder-like circumferential surface and to let the leg sections be placed on both end edges in approximately parallel with the generatix of the partially cylinder-like circumferential surface of the cover main body.

Also preferably, the cover further comprises a spring washer integrally extending from the cover main body and being folded to be placed between the cover main body and rotor.

Also preferably, a slant face is formed around the adjustment hole of the cover main body to incline downwardly toward its center.

Also preferably, a step-like difference is provided at a location overlying parts of the casing are designed to engage with the leg sections for forming a gap or gaps with respect to the leg sections.

These and other objects, features and advantages of the invention will be apparent from the following more particular description of preferred embodiments of the invention, as illustrated in the accompanying drawings.

DETAILED DESCRIPTION OF THE INVENTION

Figure 1:
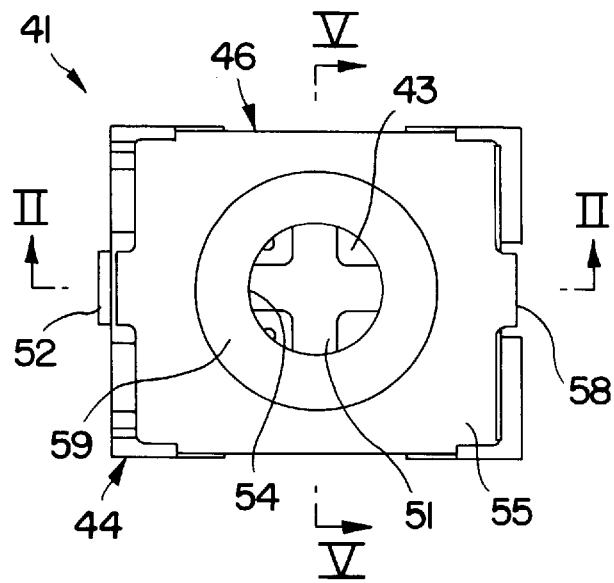
FIG. 1 is a diagram showing a plan view of a variable capacitor 41 in accordance with one embodiment of this invention.
Figure 2:
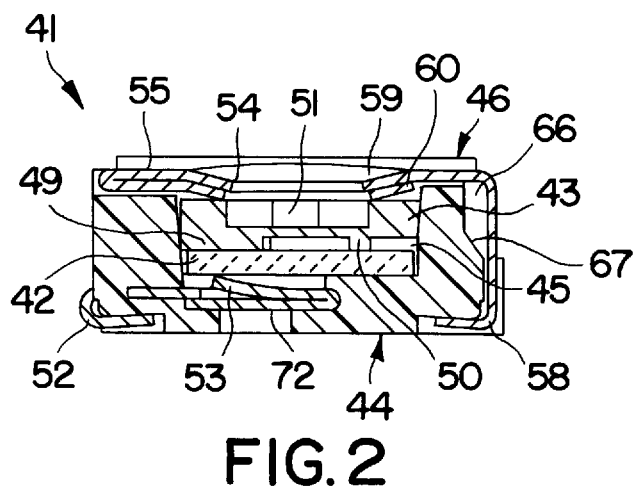
FIG. 2 is a cross-sectional diagram along line II—II of FIG. 1.
Figure 3:
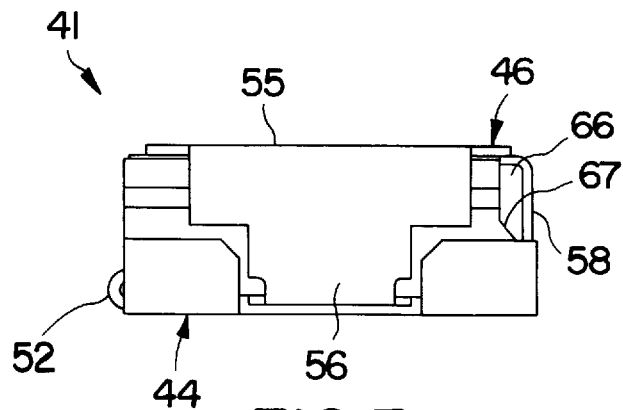
FIG. 3 is a diagram showing a front view of the variable capacitor 41 shown in FIG. 1.
Figure 4:
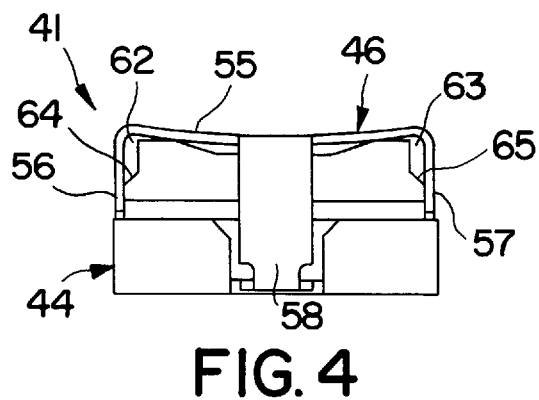
FIG. 4 is a diagram showing a right side view of the variable capacitor 41 shown in FIG. 1.
Figure 5:
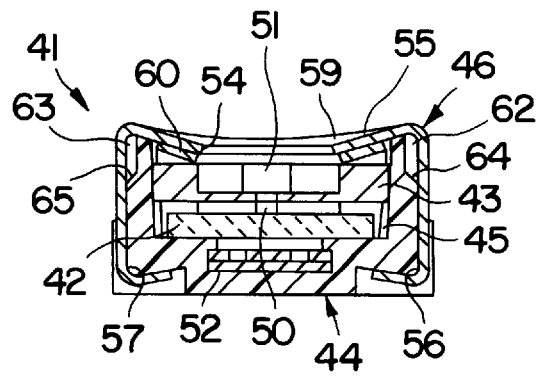
FIG. 5 is a cross-sectional view along line V—V of FIG. 1.
Figure 6:
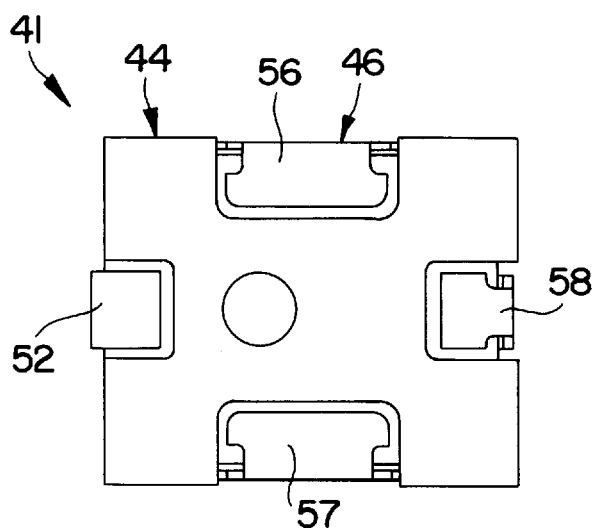
FIG. 6 is a diagram showing a bottom view of the variable capacitor 41 shown in FIG. 1.
Figure 7:
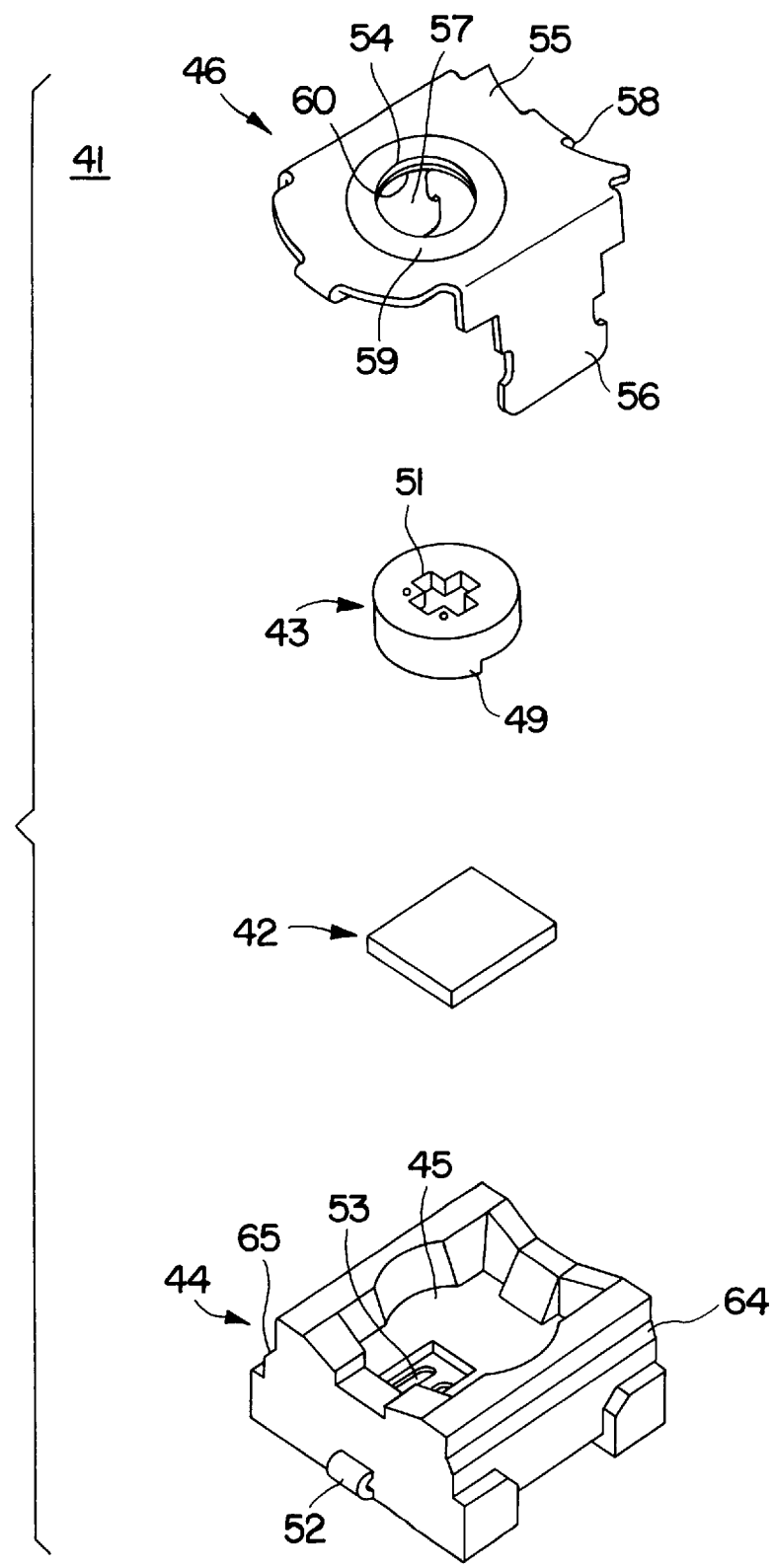
FIG. 7 is a diagram showing a perspective view of disassembled elements of the variable capacitor 41 shown in FIG. 1.
Figure 8:
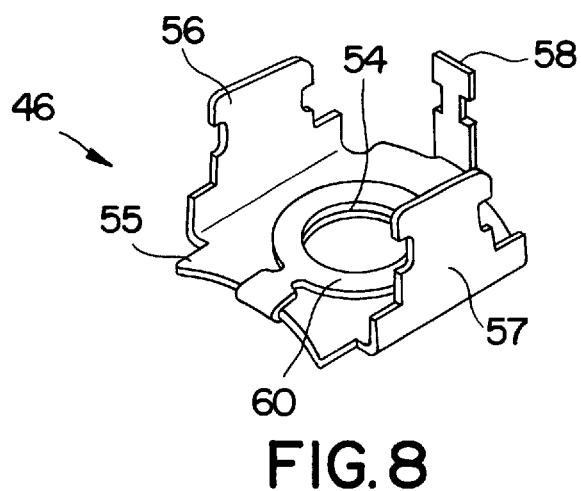
FIG. 8 is a perspective view of a cover 46 shown in FIG. 7 as look at a different view angle.
Figure 9:
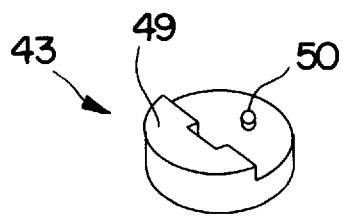
FIG. 9 is a perspective view of a rotor 43 shown in FIG. 7 at a different view angle.
Figure 10:
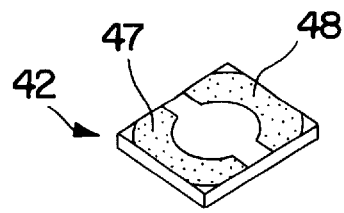
FIG. 10 is a diagram showing a perspective view of a stator 42 at a different view angle.
Figure 11:
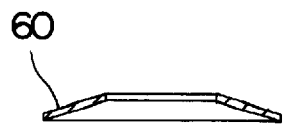
FIG. 11 is a cross-sectional diagram of a spring washer 60 as provided in the cover 46 shown in FIG. 8.

FIGS. 1 through 11 are drawings for explanation of a variable capacitor 41 in accordance with one preferred embodiment of this invention. Here, FIG. 1 is a diagram showing a plan view of the variable capacitor 41, FIG. 2 shows a cross-section taken along line II—II of FIG. 1, FIG. 3 is a front view of variable capacitor 41, FIG. 4 is a right side view of variable capacitor 41, FIG. 5 depicts a cross-section along line V—V of FIG. 1, and FIG. 6 is a bottom view of variable capacitor 41. Also, FIG. 7 illustrates a perspective view of some major elements constituting the variable capacitor 41 in an exploded manner; several ones of the elements shown in FIG. 7 are depicted in FIGS. 8, 9 and 10 from different viewing angles, respectively. Additionally, one of the elements shown in FIGS. 7 and 8 is shown in cross-section in FIG. 11.

Schematically describing the variable capacitor 41, the variable capacitor 41 comes with a stator 42 and a rotor 43 as disposed above or over the stator 42. The stator 42 and the rotor 43 are housed or enclosed within a recess section 45 of a casing 44 such that this enclosed state is retained by a cover 46.

More specifically, the stator 42 is of a rectangular plate shape and is made of a chosen dielectric material such as ceramic. As shown in FIG. 10, a stator electrode 47 is formed on the lower surface of the stator 42.

In this embodiment, a dummy electrode 48 is further formed so that it is symmetrical with the stator electrode 47 thus enabling either one of the stator electrode 47 and dummy electrode 48 to function as the stator electrode, which may in turn increase the degree of freedom relating to directionality of the stator 42 during assembly. Additionally, the dummy electrode 48 may be eliminated if such an advantage is not desired.

The rotor 43 resembles a circular plate or disk in shape as a whole. As better shown in FIG. 9, a rotor electrode 49 is formed on its lower surface side. When the rotor 43 is disposed above the stator 42, the rotor electrode 49 comes to oppose the stator electrode 47 with the stator 42 being positioned between them. A projected section 50 is also formed on the same lower surface side of the rotor 43 in a way such that it has a projection height identical to the projection height of the rotor electrode 49 thereby eliminating possible inclination of the rotor 43 above the stator 42. Further, as better illustrated in FIG. 7, a driver groove 51 for permitting insertion of the distal end of a hand tool for capacitance adjustment, such as a screwdriver, is formed in the upper surface side of the rotor 43.

The rotor 43 may be made of a chosen metal material such as brass, for example, and thus has conductivity. The rotor 43 may be obtained by metal casting/molding, forging, press-machining, etching or equivalent techniques thereto, by way of example.

The casing 44 is made of a resin material and is one which results from insert-molding of a stator terminal 52 therein. In cases where this variable capacitor 41 is for use as surface-mounted parts or components, the resin used for the casing 44 may advantageously be plastifiable materials with enhanced heat durability or resistivity—such as polyphenylene sulfide, liquid crystal polymer or the like--or thermally hardening resin, such as epoxy resin, unsaturated polyester or any equivalents thereof. Alternatively, where the capacitor is for use in high-frequency circuitry, it may be preferable to employ as such resin a specific resin material which is less in dielectric dissipation factor or loss tangent.

The above-described stator terminal 52 is so folded as to extend onto the lower surface of the casing 44, and has a contact section 53 which is exposed at the bottom plane of the recess section 45 of casing 44. This contact section 53 comes into elastic contact with the stator electrode 47 as formed on the lower surface of the stator 42 causing the stator electrode 47 and the stator terminal 52 to be electrically connected together.

Note here that the bottom plane of the recess section 45 of casing 44 is preferably closed. In this embodiment, part 72 of the stator terminal 52 is folded onto an opposite side surface of the contact section 53 to attain such closure of the bottom plane of recess section 45.

The cover 46 is made of a metal as a whole and includes a cover main body 55 which covers the upper opening of the recess section 45 of the casing 44 except for an adjustment hole 54 that exposes a driver groove 51 of the rotor 43, leg sections 56 and 57 which extend from both ends of the cover main body 55 respectively, and a rotor terminal 58 extending from the cover main body 55 in a direction different from that of the leg sections 56 and 57. The leg sections 56 and 57 as well as the rotor terminal 58 are best illustrated in FIG. 8.

The cover main body 55 is added with a specific shape as bent to produce elastic force which may act to compress the rotor 43 toward the stator 42. In this embodiment, the cover main body 55 has a specific shape as bent to substantially define a partially cylinder-like circumferential plane. Also, the relation of the bending direction of the cover main body 55 versus respective positions of the leg sections 56 and 57 is such that the leg sections 56 and 57 are placed at specifically selected locations, i.e., both end edges which extend in parallel to the generatrix of the partially cylindrical circumferential plane this cover main body 55 has.

Additionally, a frustroconical slant plane 59 is formed around the adjustment hole 54 of cover main body 55 so as to incline downwardly toward the center thereof.

The cover 46 further includes a spring washer 60 which is integrally formed as an elongated section from the cover main body 55 and is folded so that it is placed between the cover main body 55 and the rotor 43. The positional relationship between the spring washer 60 and the cover main body 55 is better shown in FIG. 8. The spring washer 60 has the form of a disk spring as shown in cross-section in FIG. 11.

Figure 12:
FIG. 12 is a diagram showing a front view of a spring washer 60a as employable as an alternative of the washer 60 shown in FIG. 11.
Figure 13:
FIG. 13 is a diagram showing a cross-section of a spring washer 60b which is still another alternative of the spring washer 60 shown in FIG. 1.

It should be noted that the spring washer 60 may be replaced with a spring washer 60a which includes a wavy form as shown in FIG. 12, or alternatively be replaced by a spring washer 60b with more than one projection 61 being formed on a flat plate as shown in FIG. 13, or still alternatively replaced with other spring washers of further modified forms.

As better depicted in FIG. 5, the leg sections 56 and 57 are brought in the state that these are engaged with the lower surface of the casing 44 by bending respective edge portions thereof, whereby the cover main body 55 is rigidly attached to the casing 44.

As discussed supra, when the leg sections 56 and 57 are in engagement with the casing 44, the leg sections 56 and 57 and the casing 44—in particular, the side surface thereof—are brought in close contact with each other resulting in possibility of causing flux used during soldering process to penetrate or "percolate" into this close contact portion based on capillary phenomenon. Such flux percolation is not preferable because this can lead to immersion or "invasion" of flux into the interior of the casing 44.

Then, in order to prevent such flux invasion, this embodiment is specifically arranged so that step-like indents 64 and 65 are provided for forming marginal spacings or "gaps" 62 and 63 with respect to the leg sections 56 and 57 at selected locations overlying certain portions of the casing 44 where the leg sections 56 and 57 are to be subject to engagement. It will be sufficient that the gaps 62 and 63 are formed by the step-like indents 64 and 65 to measure 0.1 mm or greater, respectively.

As better shown in FIG. 2, the rotor terminal 58 is folded to extend onto the lower surface of the casing 44 in a way similar to that of the stator terminal 52.

In such arrangement state of the rotor terminal 58, this rotor terminal 58 can accidentally be brought into close contact with the side surface of the casing 44 as in the case of the leg sections 56 and 57. In order to prevent flux's drifting action due to the close contact, in this embodiment, a step-like indent 67 for forming a gap 66 with respect to the rotor terminal 58 also is formed on the side surface of the casing 44.

Additionally, it is sufficient that the aforesaid step-like indents 64, 65 and 67 are exclusively formed at those portions where the leg sections 56 and 57 as well as the rotor terminal 58 are to be in close contact with the casing 44.

The variable capacitor 41 is assembled using the stator 42, the rotor 43, the casing 44 and the cover 46 as discussed above.

More specifically, the stator 42 is inserted into the recess section 45 of the casing 44; the rotor 43 is then inserted to reside thereon. At this time, the stator 42 is stationarily housed within the recess section 45 whereas the rotor 43 is rotatably housed within the recess section 45. Then, the cover 46 is disposed on the casing 44 allowing the cover main body 55 to cover the upper opening of the recess section 45. Under this condition the leg sections 56 and 57 are bent at end portions thereof respectively to be in the state of engagement with the casing 44, while causing the cover main body 55 and the spring washer 60 to produce elastic force for compressing the rotor 43 toward the stator 42 due to deformation of the bent-formed cover main body 55 and the spring washer 60 against elasticity of each of them. The rotor terminal 58 is also bent and folded at its end portion and is forced to extend along the lower surface of the casing 44.

Large-scale apparatus or lengthy production times are not necessary for bending the leg sections 56 and 57 stated above. Therefore, it becomes possible to perform assembly and placement of the cover 46 to the casing 44 with increased efficiency and reduced cost.

In addition, as discussed supra, this embodiment is arranged such that the cover main body 55 has a curved shape while exhibiting substantially a partially cylinder-like circumferential plane while allowing the leg sections 56 and 57 to be placed on both end edges of this cover main body 55, the edges of which extend in parallel to the generatrix of the partially cylinder-like circumferential plane that this cover main body 55 exhibits. Accordingly, the elastic force due to bent section of the cover main body 55 can be effectively given to the rotor 43 upon engagement of the leg sections 56 and 57 with the casing 44.

In the way discussed above, assembly of the variable capacitor 41 is completed. In this variable capacitor 41, the rotor 43 is pressed toward the stator 42 by the bent cover main body 55 and the spring washer 60, thus obtaining stable close contact state between the rotor 43 and the stator 42, which in turn leads to an increase in stability of the electrostatic capacitance as formed between the stator electrode 47 and the rotor electrode 49.

The aforesaid electrostatic capacitance is taken by the stator terminal 52 as electrically connected to the stator electrode 47 and the rotor terminal 58 provided at the cover 46 to be in contact with the rotor 43. A Phillips head screwdriver or the like is inserted into the driver groove 51 through the adjustment hole 54 and mated therewith for rotation of the rotor 43 whereby the effective opposed area between the stator electrode 47 and the rotor electrode 49 is rendered variable with rotation of the screwdriver thus enabling the electrostatic capacitance to vary accordingly.

In this embodiment, the cover main body 55 may be enlarged to correspond to the full outer diameter of the variable capacitor 41. It is thus possible to sufficiently increase the elastic force as applied by the cover main body 55. Further, since the spring washer 60 is placed between the cover main body 55 and the rotor 43, it becomes possible by action of both the cover main body 55 and the spring washer 60 to obtain intended elastic force acting to let the rotor 43 be in close contact with the stator 42. Accordingly, it is possible to attain stable and close contact of the rotor 43 with the stator 42, which results in an increase in stability of electrostatic capacitance.

Further, since the adjustment hole 54 formed in the cover main body 55 may function as a guide for insertion of a driver or the like into the driver groove 51, this renders insertion works easier while at the same time enabling the driver or the like to be firmly inserted in the driver groove 51 after insertion. Furthermore, since the slant face 59 is formed around the adjustment hole 54 to incline or "slope" downwardly to the center of the cover main body 55, it becomes easier for the distal end of the driver or the like to correctly reach the driver groove 51 due to the fact that the driver distal end is guided along this slant face 59 when an attempt is made to insert the driver or the like into the driver groove 51. For these reasons, it becomes possible to improve workability of capacitance adjustment while simultaneously enabling easy accommodation to automatic adjustment architecture.

This variable capacitor 41 is mountable on a printed circuit board (not shown) with the lower surface of casing 44 being directed thereto. In this mounted state the stator terminal 52 and the rotor terminal 58 are soldered to corresponding conductive land pads on the circuit board.

Figure 14:
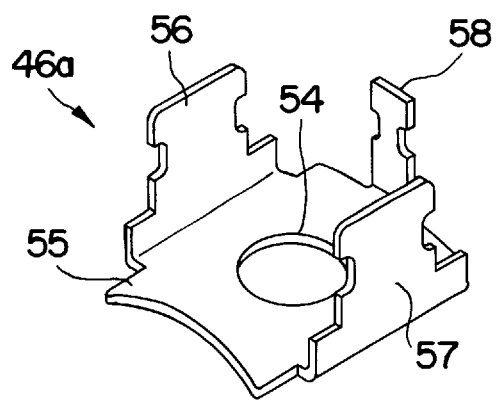
FIG. 14 is a perspective view of a cover 46a as used in place of the cover 46 shown in FIG. 8.

FIG. 14 is a perspective diagram corresponding to FIG. 8 for showing a cover 46*a* as used with a variable capacitor in accordance with another embodiment of this invention.

The cover 46*a* shown in FIG. 14 does not come with an element equivalent to the spring washer 60 shown in FIG. 8. Also, the slant face 59 as better shown in FIG. 7 is not formed. Except for these points the cover 46*a* is substantially the same as the cover 46 shown in FIG. 8 and the like. Accordingly, like elements are associated with like reference numerals with any overlapping explanations thereof being omitted herein.

In this way, while a spring washer prepared as a separate member may be employed where the cover 46*a* has no spring washers integrally formed therewith, it may alternatively be arranged in such a manner that the elastic force compressing the rotor against the stator is given by the curved cover main body 55 alone.

Figure 15:
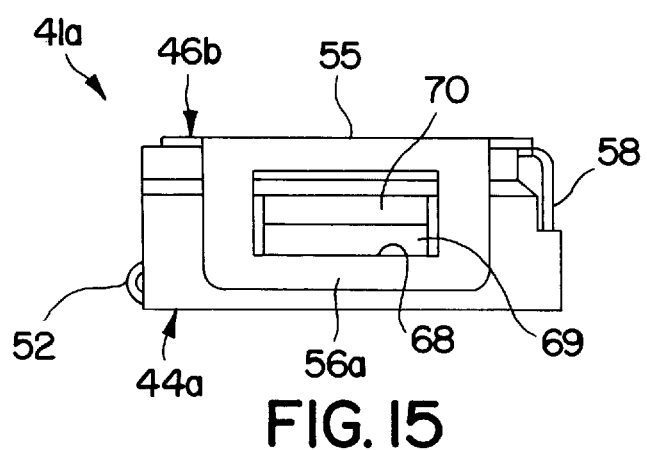
FIG. 15 is a diagram showing a front view of a variable capacitor 41a in accordance with another embodiment of this invention.
Figure 16:
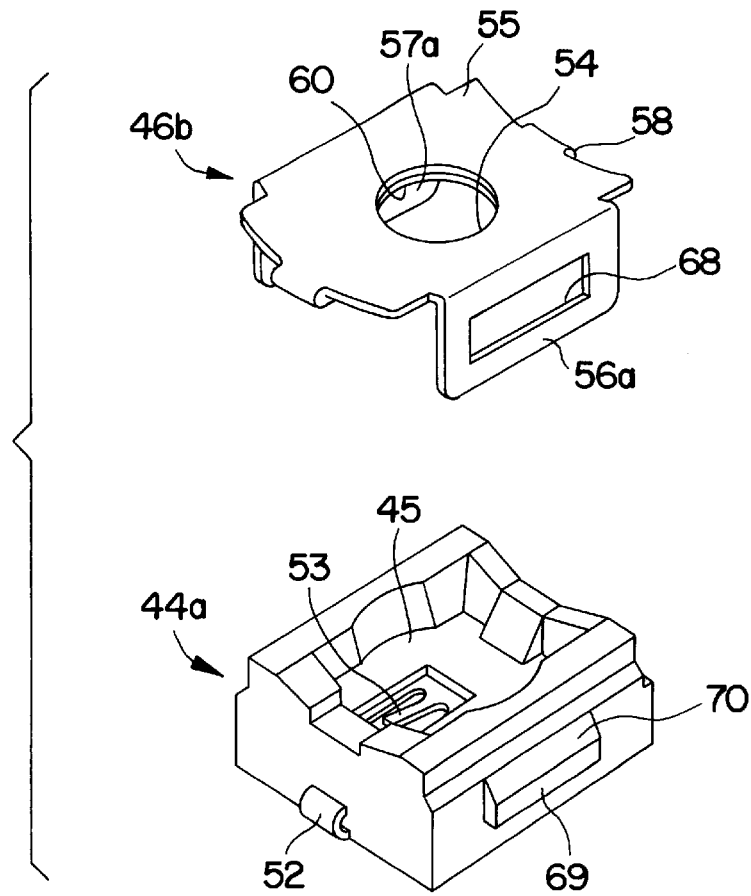
FIG. 16 is a diagram showing in an exploded manner a perspective view of a cover 47b and casing 44a provided in the variable capacitor 41a shown in FIG. 15.
Figure 17:
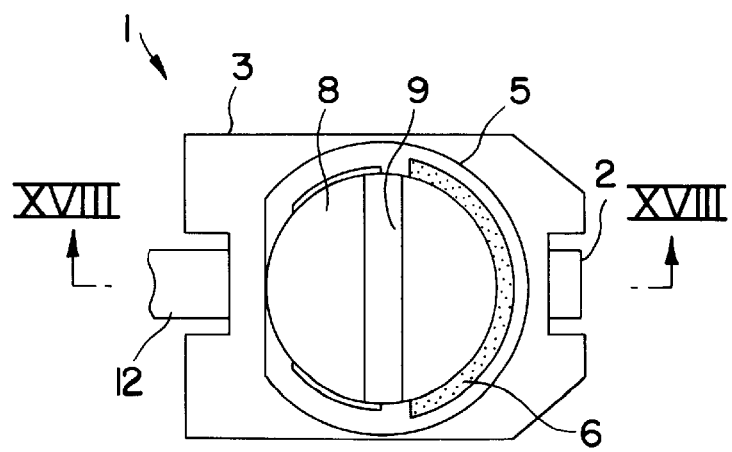
FIG. 17 is a diagram showing a plan view of a first prior art variable capacitor 1.
Figure 18:
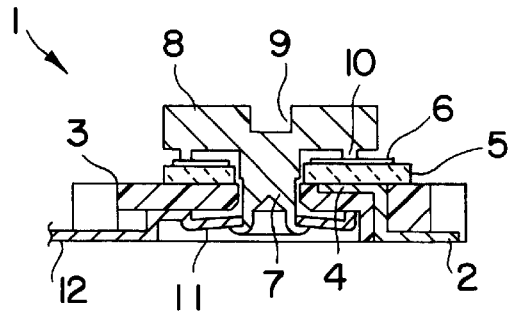
FIG. 18 is a cross-sectional diagram along line VXIII—XVIII of FIG. 17.
Figure 19:
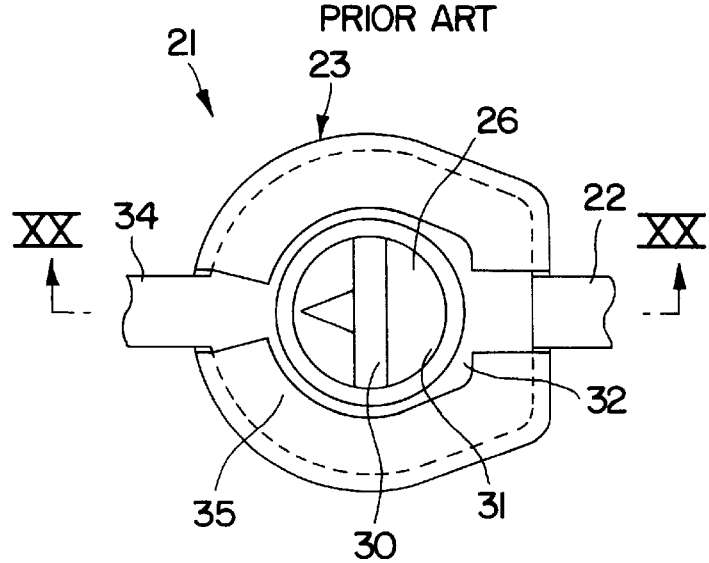
FIG. 19 is a diagram showing a plan view of a second prior art variable capacitor 21.
Figure 20:
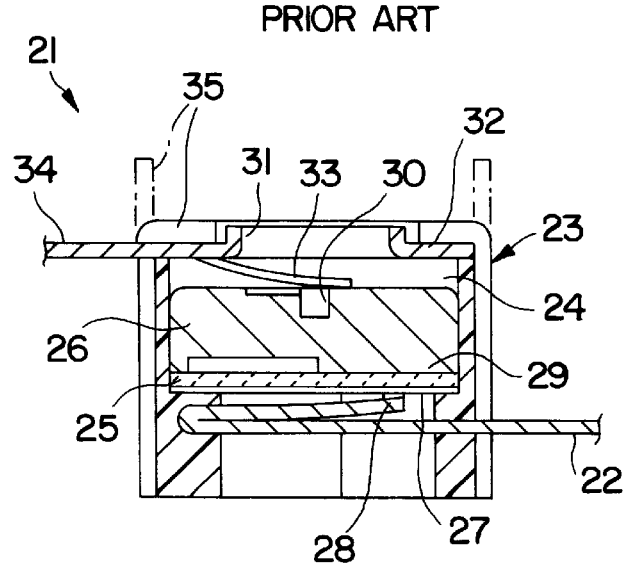
FIG. 20 is a cross-sectional diagram along line XX—XX of FIG. 19.

FIGS. 15 and 16 are diagrams for explanation of a still another embodiment of this invention, wherein FIG. 15 shows a front view of a variable capacitor 41*a* whereas FIG. 16 is a perspective view showing in an exploded manner a cover 46*b* and casing 44*a* as provided in the variable capacitor 41*a*.

This embodiment is principally different from the embodiments stated supra in structure of the securing cover 46*b* to the casing 44*a*. More specifically, the leg sections 56*a* and 57*a* of the cover 46*b* are provided with an engagement windows 68 (the engagement window of the leg section 57*a* is hidden in the drawing). On the other hand, corresponding engagement projection sections 69 are provided on opposite side walls of the casing 44*a* for being engaged with engagement windows 68, respectively. One engagement projection associated with the hidden engagement window of the leg section 57*a* is also hidden in the drawing.

Explaining with regard to the side of the visible engagement window 68 and the engagement projection section 69, the engagement projection section 69 is preferably added at its upper surface 70 with a slant face which slopes downwardly to the outside. With such an arrangement, while letting the cover 46*b* approach casing 44*a*, when the leg section 56*a* is guided by the slanted upper surface 70 of engagement projection section 69 and is then deformed against its own elasticity resulting in alignment between engagement window 68 and engagement projection 69, it is possible to allow engagement projection 69 to be automatically mated with engagement window 68 in deference to its own elasticity.

It is to be noted that in the embodiment shown in FIGS. 15 and 16 also, the cover 46*b* does not necessarily come with the slant face 59 which is better shown in FIG. 7. Since the remaining arrangement is substantially the same as that of the foregoing embodiments, like elements are added with like reference numerals and any duplicate explanations thereof will be omitted herein.

Although this invention has been described with respect to some illustrative embodiments, various changes and modifications may be possible within the scope of this invention.

By way of example, while the shape of the stator 42 was selected as a rectangular plate-like shape in the illustrative embodiments, any other shape may be employable as long as these alternatives ensure rotation within the recess section 45 of casing 44.

While the stator electrode 47 was formed on the lower surface of the stator 42, the electrode may oppose the rotor electrode via at least part of the stator 42; for instance, it may be formed within the stator 42. In cases where the stator electrode 47 is formed within the stator 42, the structure may be modified so that an extension electrode elongated from the stator electrode 47 up to the stator 42—the lower surface thereof, for example—is formed at the stator 42 thus enabling the stator electrode 47 to be electrically connected to the contact section 53 of the stator terminal 52.

The cover 46 integrally forms not only the leg sections 56 and 57 but also the rotor terminal 58. Accordingly, the leg sections 56 and 57 and the rotor terminal 58 are electrically conducted together. Due to this fact, the structure may be designed so that any special rotor terminal is not provided and that at least one of the leg sections 56 and 57 is used as the rotor terminal.

In addition, in the illustrative embodiments, the cover main body 55 is added with a curvature shape in order to provide elastic force that compresses the rotor 43 toward the stator 42; however, such curved shape may not be given thereto. Even in the case of adding no curvature shapes, the aforesaid elastic force is obtainable by arranging such that a spring washer integral with the cover main body or separate spring washer or the like is disposed between the cover main body and the rotor.

As apparent from the foregoing description, in accordance with this invention, the cover is made of metal and is secured to its associated casing by engaging its leg sections to the casing. Therefore, unlike the second prior art device described above, it is no longer necessary to thermally deform the upper end edge of the casing 23 upon application of heat in order to secure the cover 32 to the casing 23. Accordingly, no large-scale apparatus or equipment is required while eliminating relatively long time consumed during the cooling of the casing 23, and rendering the assembly much easier.

Further, since the adjustment hole as formed in the cover main body acts as a guide for insertion of a hand tool, such as a screwdriver or the like, into the driver groove provided at the rotor, insertion become easier while simultaneously ensuring that the driver or the like once inserted thereinto does not easily come off from the driver groove. As a result, it becomes possible to improve workability of capacitance adjustments.

Furthermore, since the stator forming the stator electrode is a member which is separated from the casing, even where a resin casing is mechanically and thermally deformable, such deformation does not affect the stator, thus enabling the stator-to-rotor electrode contact to be stabilized, which in turn leads to an increase in stability of electrostatic capacitance, also.

In this invention, adding a curved shape to the cover main body makes it possible to obtain, based on this shape, an elastic force acting to cause the rotor to come into close contact with the stator. As a consequence, it is foreseeable in some cases that sufficient elastic force may be obtained without having to employ a spring washer integral with the cover main body, a separate spring washer or the like. If this is the case, a machining process for obtaining the cover can be made easier while reducing parts in number due to omission of certain parts such as spring washers. On the other hand, where such spring washer is used, it becomes possible to give more stable elastic force. In addition, since the cover main body may be enlarged in size to become equal to the full outer diameter of the variable capacitor, the resulting elastic force as given by the curved shape of this cover main body can be sufficiently increased in strength. Consequently, it becomes possible to allow the rotor to be in close contact with the stator with stability, resulting in an increase in stability of electrostatic capacitance.

In this invention, since the cover main body has its shape defining substantially a partially cylinder-like circumferential plane while letting the leg sections be placed on both end edges of this cover main body which edges are in parallel to the generatrix of the partially cylinder-like circumferential plane the cover main body exhibits, it is possible when the leg sections are engaged with the casing to effectively apply intended elastic force to the rotor which force is due to curvature of the cover main body.

Still further, in this invention, the cover comes with a spring washer which extends integrally from the cover main body and is folded to be placed between the cover main body and rotor, it is possible by both the cover main body and spring washer to obtain elastic force that may act to let the rotor be brought into close contact with stator.

Consequently, the bending or flexure amount of the spring can be increased. Even upon occurrence of accidental looseness at attachment portions of leg sections with respect to casing due to heat generation during soldering reflow process, a reduction of torque of rotor's rotation may be suppressed because of sufficient bias of the spring as given by the cover main body and spring washer. Moreover, a decrease in close contact between the stator and rotor may also be suppressed enabling electrostatic capacitance (setting drift) to be stabilized successfully.

Further, since the spring washer is formed by part of the cover, it will no longer lead to an increase in component number and assembly step number.

Furthermore, in this invention, where a slant face is formed around the adjustment hole of cover main body to incline or "slope" downwardly to the center of the cover main body, when an attempt is made to insert a hand tool such as a driver into the driver groove, the driver may be guided along the slant face around the adjustment hole even if the distal end of such driver is deviated in position from the adjustment hole, thereby enabling the tool to appropriately arrive at the driver groove. Accordingly, workability of capacitance adjustment may be further improved. This also makes it possible to easily accommodate automatic adjustments.

Still further, where more than one step-like difference for formation of gaps with respect to the leg sections is provided at a position overlying portions of the casings with which the leg sections are to be engaged, it becomes possible to interrupt or block elevation of flux based on capillary action through close contact sections between the leg sections and the casing structure during a soldering process by use of soldering iron tools. It is thus possible to successfully eliminate percolation or "invasion" of flux into the interior of the casing. Especially, flux invasion onto the sliding surfaces of the stator and rotor may be prevented enabling attainment of stability of electrostatic capacitance while simultaneously enabling elimination of a decrease in Q characteristics.

While the invention has been described in detail and with reference to specific embodiments thereof, it will be apparent to one skilled in the art that various changes and modifications can be made therein without departing from the spirit and scope thereof.

What is claimed is:

1. A variable capacitor comprising:
   a stator made of a dielectric material with a stator electrode formed thereon;
   a rotor having conductivity and disposed above said stator with a rotor electrode being formed on its lower surface to oppose said stator electrode through said stator and with a driver groove formed on the upper surface side thereof;
   a casing made of resin and having a recess section for statically housing said stator and rotatably housing said rotor therein respectively, said casing having a stator terminal being insert-molded therein to be electrically connected to said stator electrode; and
   a cover made of metal including a cover main body covering the upper opening of said recess section except for an adjustment hole exposing said driver groove, leg sections extending from both side sections of said cover main body for securing said cover main body to said casing by engagement with said casing respectively, and a rotor terminal as formed to extend from said cover main body.

2. The variable capacitor as recited in claim 1, wherein said cover main body includes a bent portion to provide elastic force pressing said rotor toward said stator.

3. The variable capacitor as recited in claim 1, wherein said cover main body has a bent shape portion to substantially define a partially cylinder-like circumferential surface and to let said leg sections be placed on both end edges of said cover main body which are in approximately parallel with generatix of the partially cylinder-like circumferential surface of said cover main body.

4. The variable capacitor as recited in claim 2, wherein said cover main body has a bent shape portion to substantially define a partially cylinder-like circumferential surface and to let said leg sections be placed on both end edges of said cover main body which are in approximately parallel with generatix of the partially cylinder-like circumferential surface of said cover main body.

5. The variable capacitor as recited in claim 1, wherein said cover further comprises a spring washer integrally extending from said cover main body and being folded to be placed between said cover main body and said rotor.

6. The variable capacitor as recited in claim 2, wherein said cover further comprises a spring washer integrally extending from said cover main body and being folded to be placed between said cover main body and said rotor.

7. The variable capacitor as recited in claim 3, wherein said cover further comprises a spring washer integrally extending from said cover main body and being folded to be placed between said cover main body and said rotor.

8. The variable capacitor as recited in claim 1, wherein a slant face is formed around said adjustment hole of said cover main body to incline downwardly toward the center thereof.

9. The variable capacitor as recited in claim 2, wherein a slant face is formed around said adjustment hole of said cover main body to incline downwardly toward the center thereof.

10. The variable capacitor as recited in claim 3, wherein a slant face is formed around said adjustment hole of said cover main body to incline downwardly toward the center thereof.

11. The variable capacitor as recited in claim 4, wherein a slant face is formed around said adjustment hole of said cover main body to incline downwardly toward the center thereof.

12. The variable capacitor as recited in claim 1, wherein a step-like difference is provided at a location overlying parts of said casing designed to engage with said leg sections for forming a gap or gaps with respect to said leg sections.

13. The variable capacitor as recited in claim 2, wherein a step-like difference is provided at a location overlying parts of said casing designed to engage with said leg sections for forming a gap or gaps with respect to said leg sections.

14. The variable capacitor as recited in claim 3, wherein a step-like difference is provided at a location overlying parts of said casing designed to engage with said leg sections for forming a gap or gaps with respect to said leg sections.

15. The variable capacitor as recited in claim 4, wherein a step-like difference is provided at a location overlying parts of said casing designed to engage with said leg sections for forming a gap or gaps with respect to said leg sections.

16. The variable capacitor as recited in claim 5, wherein a step-like difference is provided at a location overlying parts of said casing designed to engage with said leg sections for forming a gap or gaps with respect to said leg sections.

17. A method of manufacturing a variable capacitor, comprising the steps of:
   providing a stator made of a dielectric material;
   forming a stator electrode on said stator;
   providing a rotor having conductivity;
   forming a rotor electrode on said rotor;
   providing a casing made of resin and having a recess section and a stator terminal;
   inserting said stator in said recess of said casing with said stator electrode facing a bottom of said recess;
   inserting said rotor in said recess of said casing with said rotor electrode facing said stator;
   disposing a cover on said casing, said cover having leg portions and a spring washing; and
   engaging said leg portions on sides of said casing such that said cover and said spring washer causes said stator and said rotor to be in close contact with each other.

18. The method as recited in claim 17, further comprising the steps of:
   providing a rotor terminal in electrical contact with said rotor electrode; and
   bending said rotor terminal at its end portion to extend along a lower surface of said casing.

19. The method as recited in claim 17, wherein said step of providing said cover includes providing a curved portion having a partial cylinder circumferential plane with said leg sections place on edges of said cover which extend in parallel to the generatrix of the partial cylinder circumferential plane.

* * * * *